United States Patent [19]

Ishida et al.

[11] Patent Number: 4,846,925

[45] Date of Patent: Jul. 11, 1989

[54] HORIZONTAL MULTIPLATEN PRESS

[75] Inventors: Reiziro Ishida; Shoichi Inoue; Masao Ariga, all of Nagoya; Chuji Yamamoto, Obu, all of Japan

[73] Assignee: Taihei Machinery Works, Ltd., Japan

[21] Appl. No.: 163

[22] Filed: Jan. 2, 1987

[51] Int. Cl.⁴ ........................ B30B 12/00; B30B 15/28; B32B 35/00

[52] U.S. Cl. ............................... 156/583.1; 100/93 P; 156/583.91

[58] Field of Search ...................... 156/580, 583.1, 582, 156/583.91; 100/93 P

[56] References Cited

U.S. PATENT DOCUMENTS

| | | | |
|---|---|---|---|
| 2,685,374 | 8/1954 | Croston | 214/1 |
| 2,983,635 | 5/1961 | Richardson | 156/102 |
| 3,129,827 | 4/1964 | Hutter | 214/16.4 |
| 3,170,189 | 2/1965 | Hutter | 18/4 |
| 3,923,150 | 12/1975 | Jager | 198/780 |
| 3,945,413 | 3/1976 | Eriksson | 144/246 R |
| 4,701,240 | 10/1987 | Kraemer | 156/582 |

FOREIGN PATENT DOCUMENTS

| | | |
|---|---|---|
| 60-79908 | 5/1985 | Japan . |
| 60-79909 | 5/1985 | Japan . |
| 60-87005 | 5/1985 | Japan . |
| 60-99602 | 6/1985 | Japan . |
| 61-3701 | 1/1986 | Japan . |

*Primary Examiner*—George F. Lesmes
*Assistant Examiner*—J. Davis
*Attorney, Agent, or Firm*—Stephen G. Rudisill

[57] ABSTRACT

A horizontal multiplaten press used for pressing sheet materials under heat for making plywood, decorative laminate or veneer. It has a pair of vertically disposed and horizontally spaced apart frames. At least one upper beam and at least one lower beam extend horizontally to connect the frames at their upper and lower ends, respectively. Rails are provided on each beam and extend along its length. Heating platens are vertically disposed between the frames in parallel to one another and are horizontally movably supported on the rails. The platens define therebetween a plurality of spaces in which the sheet materials to be heated and pressed can be vertically disposed. At least one urging device is provided on at least one of the frames for moving the platens to and away from one another. A mechanism is provided on the rails on at least one of the beams for allowing the deformation of each platen in a vertical direction.

12 Claims, 4 Drawing Sheets

HORIZONTAL MULTIPLATEN PRESS

BACKGROUND OF THE INVENTION

1. Field of the Invention

This invention relates to a horizontal multiplaten press which is used for pressing sheet materials under heat for manufacturing plywood, decorative laminate or veneer and which has a plurality of horizontally movable vertical heating platens which are equally spaced apart from one another so that a sheet material may be heated and pressed between every two adjoining heating platens.

2. Description of the Related Art

There is known a multiplaten press which is mainly used for manufacturing plywood. It usually comprises an upper frame, a lower frame, a plurality of heating platens which are horizontally disposed between the upper and lower frames and a moving platen which is vertically movable by a ram cylinder provided on the lower frame. After the sheet materials to be pressed have each been placed between every two adjoining heating platens, the moving platen is raised to push up the heating platens one after another, beginning with the lowermost one, whereby the press is closed for pressing the sheet materials under heat for a predetermined length of time.

Each heating platen is provided with a supporting lug at each of the four corners thereof and each lug is supported on a structure which is supported on a prop and shaped like a ladder, whereby each heating platen is supported in its horizontal position. Each heating platen has a thickness which is greater than what is required for providing the strength as required for supporting the sheet material to be pressed, since a high degree of rigidity is additionally required for preventing the platen from bending due to its own weight. The platen has, therefore, a heavy weight.

As the heating platens are heavy, there arises a large difference between the pressure which is applied to the upper sheet material and the pressure to the lower sheet material. This difference brings about the lack of adhesion uniformity in each sheet material and a reduction of its thickness. Moreover, the ram cylinder for raising or lowering the heating platens must have a large diameter and a large amount of a working fluid must be supplied to the cylinder. Therefore, a large fluid pressure unit is required and increases the size of the press per se.

SUMMARY OF THE INVENTION

It is an object of this invention to provide a horizontal multiplaten press including a plurality of heating platens which are easy to maintain or change, do not bend by their own weight, have a small thickness and yet a satisfactorily high degree of strength, are therefore light in weight and are spaced apart from one another by a small distance enabling a reduction in the dimensions of the press as a whole.

It is another object of this invention to provide a horizontal multiplaten press which can press each sheet material uniformly and thereby eliminate its lack of adhesion uniformity and its reduction of thickness.

It is still another object of this invention to provide a horizontal multiplaten press which enables the sheet materials to be pressed to move smoothly, even if there may be any dimensional error in the preparation of any heating platen, or even if the heating platens may have any strain due to thermal expansion.

It is a further object of this invention to provide a horizontal multiplaten press which can apply a sufficiently large amount of pressure to even the lower end of each sheet material to be pressed and thereby ensure the proper adhesion thereof and can also prevent any bending or separation from occurring to the lower end of each sheet material when it is pushed up.

It is a further object of this invention to provide a horizontal multiplaten press which can effect the uniform adhesion of any part of each sheet material to be pressed and can adapt itself to any variation in dimensions of the sheet materials to be pressed.

These objects are attained by a press comprising a pair of upright frames facing each other, at least one upper beam connecting the upper ends of the frames, at least one lower beam connecting the lower ends of the frames, rail means provided on each of the upper and lower beams and extending along the length thereof, a plurality of heating platens disposed vertically in parallel to one another between the frames and supported by the rail means reciprocatively movably along the length thereof, a plurality of sheet materials being heated and pressed by and between the heating platens, at least one urging means provided on at least one of the frames for urging the heating platens to move toward or away from one another, and means provided on at least one of the rail means on the upper and lower beams for allowing the vertical deformation of each of the heating platens.

Other objects, features and advantages of this invention will become apparent to anybody of ordinary skill in the art from the following description and the accompanying drawings.

DETAILED DESCRIPTION OF THE PREFERRED EMBODIMENT

Figure 1:
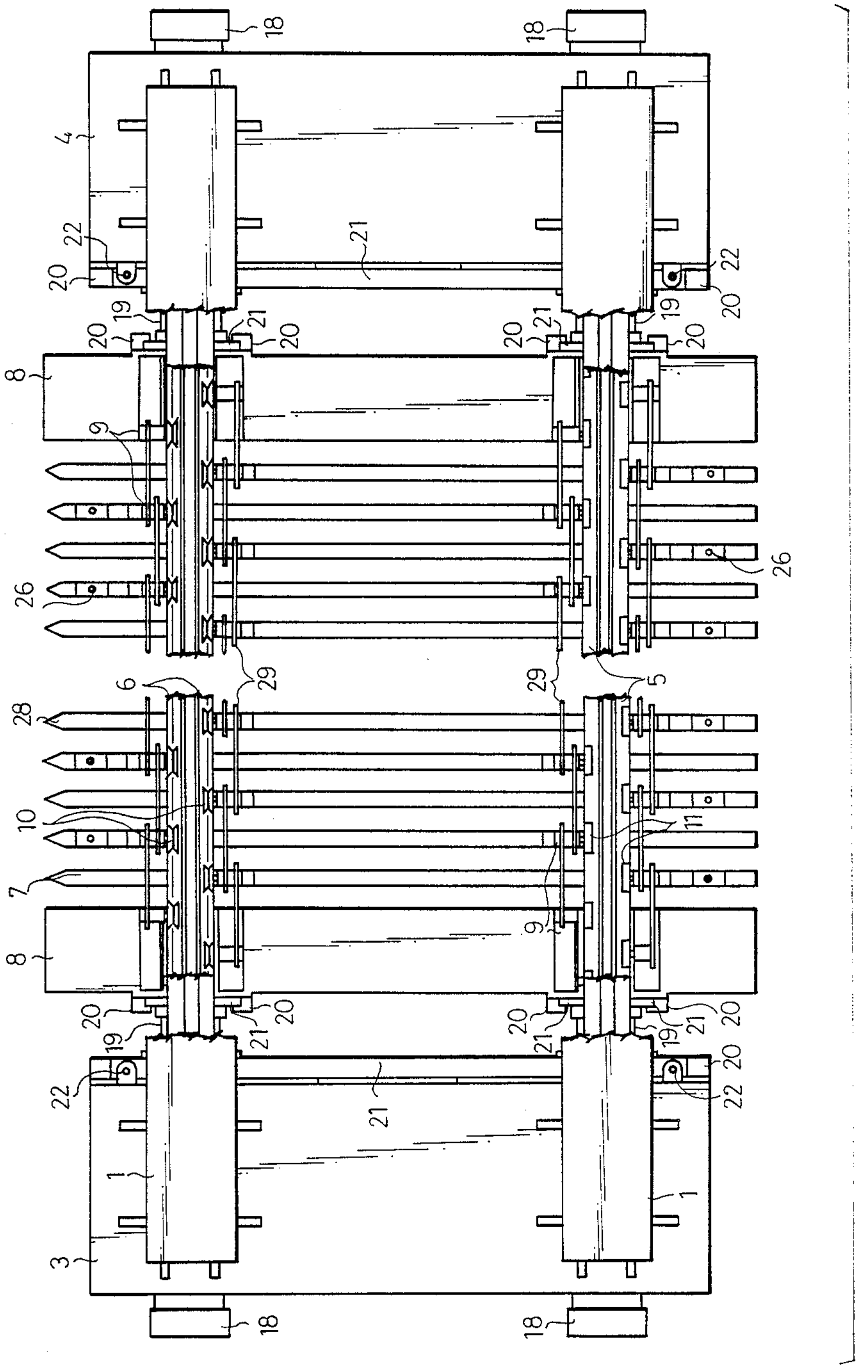
FIG. 1 is a top plan view of a press embodying this invention.

Referring to the drawings in further detail, a press embodying this invention includes a pair of horizontally spaced apart upper beams 1 and a pair of horizontally spaced apart lower beams 2 which are vertically spaced apart from the upper beams 1, respectively. Each of the upper beams 1 has one end connected to the upper end of an upright frame 3 and the other end thereof is connected to the upper end of another upright frame 4 spaced horizontally apart from the frame 3. Each of the lower beams 2 has one end connected to the lower end of the frame 3 and the other end thereof is connected to the lower end of the frame 4. Each of the upper and lower beams 1 and 2 which are located on one side of the press is provided with a rail 5. Each of the other upper and lower beams 1 and 2, which are located on the other side of the press, is also provided with a rail 6. The rails 5 and 6 are provided for different purposes, as will hereinafter become apparent.

The press also includes a plurality of vertical heating platens 7 disposed between the frames 3 and 4 and a pair of vertically disposed moving platens 8 between which the heating platens 7 are located. The heating and moving platens 7 and 8 are provided with brackets 9 at each of the upper and lower ends thereof adjacent to each side of the press. The brackets 9 on that side of the press on which the rails 6 are located are each provided with an engaging member 10 which engages one of the rails 6. The brackets 9 on the opposite side of the press are each provided for supporting a moving member 11 resting on one of the rails 5. The heating and moving platens 7 and 8 are supported in parallel to one another on the rails 5 and 6 by the moving and engaging members 11 and 10, respectively.

Each moving member 11 comprises a roller which can roll on one of the rails 5 having a flat shape, as shown in FIGS. 1 to 4. Each engaging member 10 comprises a V-shaped wheel which is movable on one of the rails 6 having a V-shaped cross section. Alternatively, each moving member 11 may be of the type having a surface which slidably contacts one of the rails 5, or each engaging member 10 may be of the type having a convex portion, while each rail 6 has a concave portion, so that each member 10 may be movably engaged in one of the rails 6. The rails 6 and the engaging members 10 are located on that side of the press which defines a charging end for the sheet materials 12 to be pressed and hold the heating and moving platens 7 and 8 in position. On the other hand, the rails 5 and the moving members 11 are located on the opposite side of the press or its discharging end and allow the to-and-fro deformation of the heating and moving platens 7 and 8 which may result from their thermal expansion. As used herein, to and fro is intended to define the direction perpendicular to the previously described vertical and horizontal directions. Alternatively, the rails 6 and the engaging members 10 can be provided at the discharging end of the press for the purpose which has hereinabove been stated.

At least the upper or lower rails 5 and 6 are vertically movable. At least the upper or lower beams 1 or 2 are each provided with a guide surface 13 along which each of at least the upper or lower rails 5 and 6 is vertically slidable. The movable rails 5 and 6 allow the thermal or other vertical expansion or deformation of the heating and moving platens 7 and 8 which are each supported at four points on the rails 5 and 6 by the moving and engaging members 11 and 10.

Figure 2:
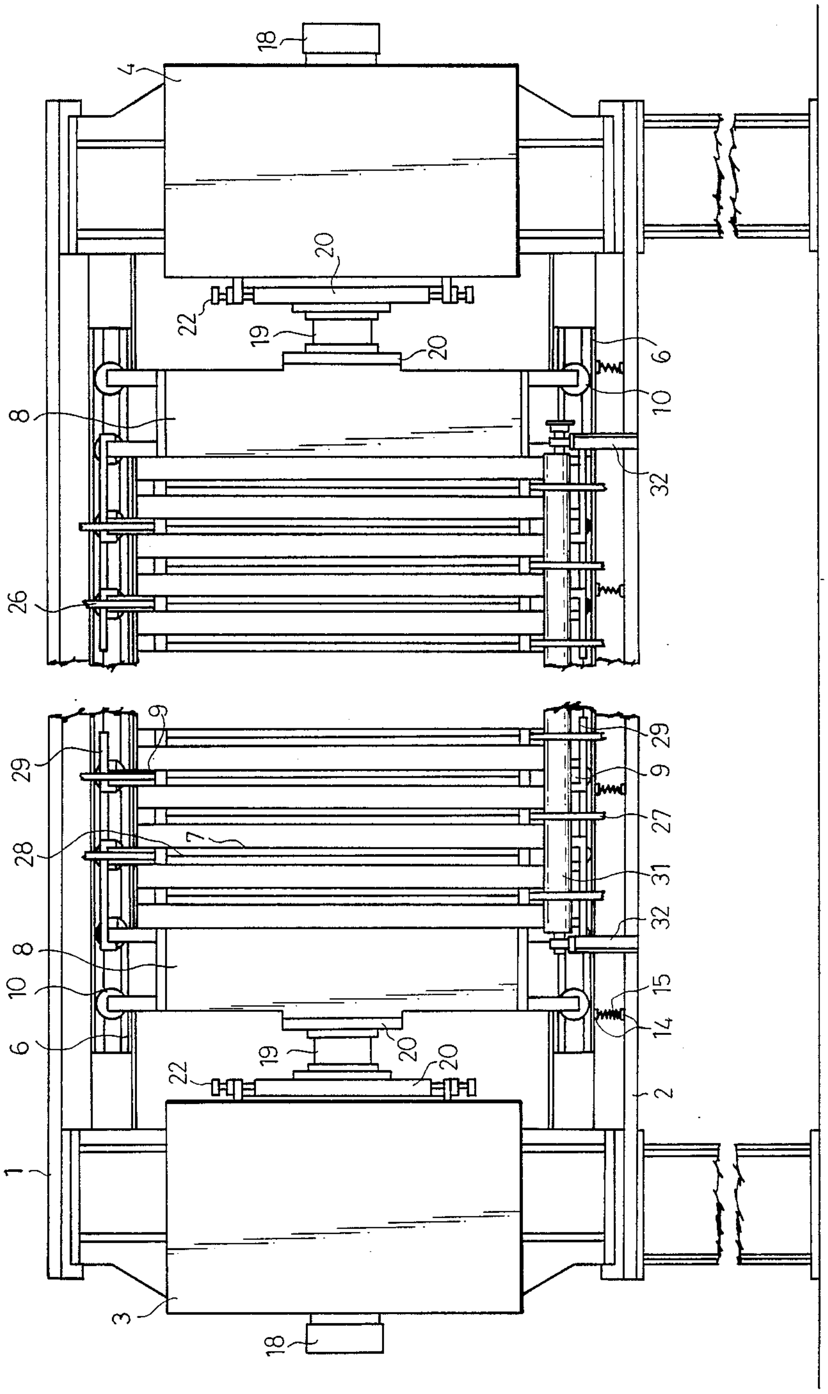
FIG. 2 is a side elevational view of the press.
Figure 4:
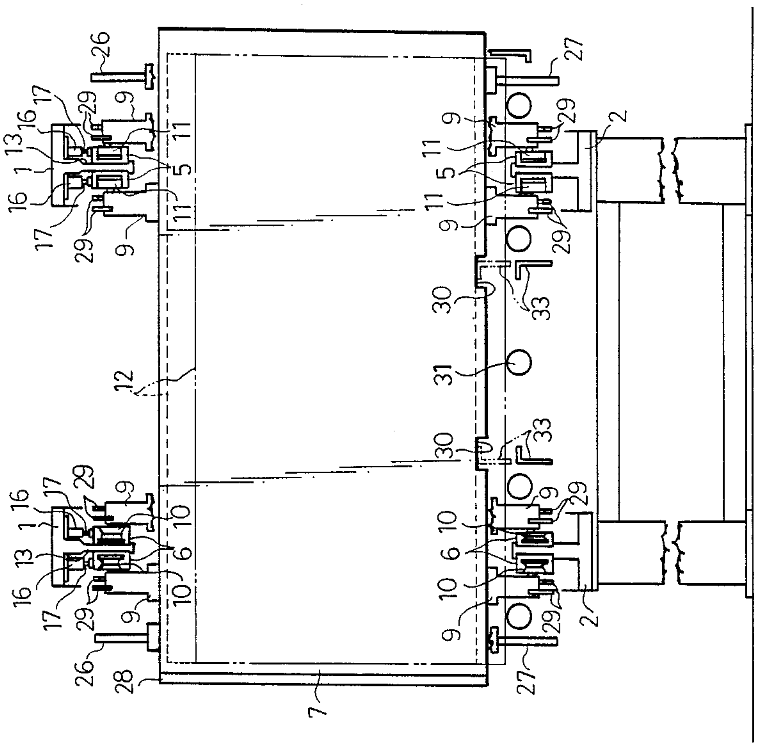
FIG. 4 is a view similar to FIG. 3, but showing a different embodiment of this invention.
Figure 3:
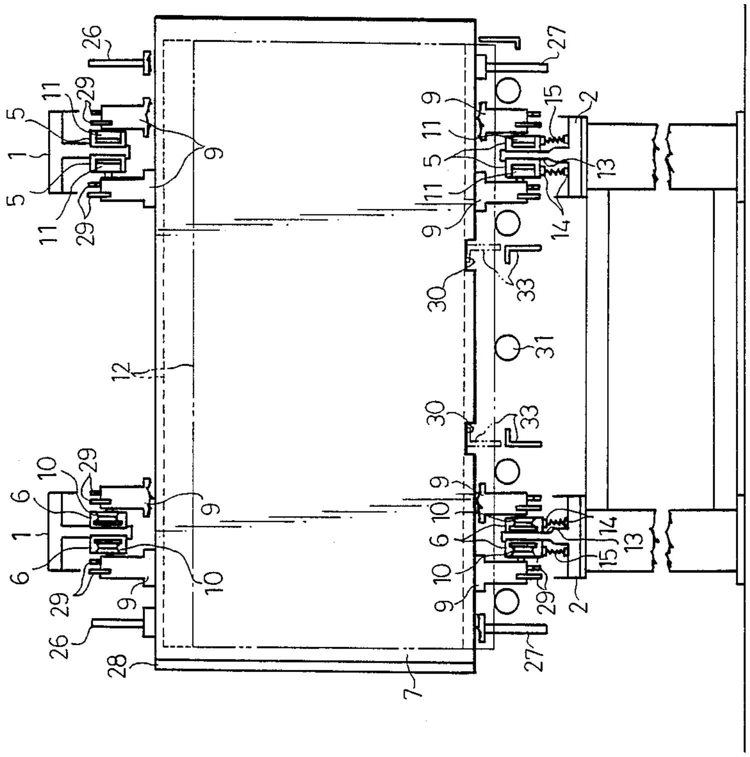
FIG. 3 is a front elevational view of the press.

More specifically, means for supporting the heating platens 7 vertically deformably are shown by way of example in FIGS. 2 and 3. The lower rails 5 and 6 are vertically slidable along the guide surfaces 13 of the lower beams 2. A plurality of pairs of spaced apart spring supports 14 are provided between the upper surfaces of the lower beams 2 and the lower surfaces of the rails 5 and 6, respectively, and are appropriately spaced apart from one another along the length thereof. A spring 15 is provided between each pair of spring supports 14 for connecting one of the lower beams 2 with the rail 5 or 6. The springs 15 normally urge the rails 5 and 6 upwardly. According to an alternative arrangement which is shown in FIG. 4, however, means are provided for urging the upper rails 5 and 6 downwardly. The upper rails 5 and 6 are vertically slidable along the guide surfaces 13 of the upper beams 1. A plurality of small fluid cylinders 16 are mounted on the lower surface of each upper beam 1 and are appropriately spaced apart from one another along the length thereof. Each cylinder 16 includes a piston rod 17 having an outer end connected to the upper surface of one of the rails 5 and 6. Alternatively, it is, of course, possible to provide the springs 15 between the upper beams 1 and the upper rails 5 and 6, or the fluid cylinders 16 between the lower beams 2 and the lower rails 5 and 6.

A plurality of fluid cylinders 18 are provided on at least one of the frames 3 and 4, or on both of them as shown in FIGS. 1 and 2. Each cylinder 18 has a ram 19 connected to one of the moving platens 8, so that the cylinders 18 may be able to move the moving platens 8 and thereby the heating platens 7 horizontally.

Figure 5:
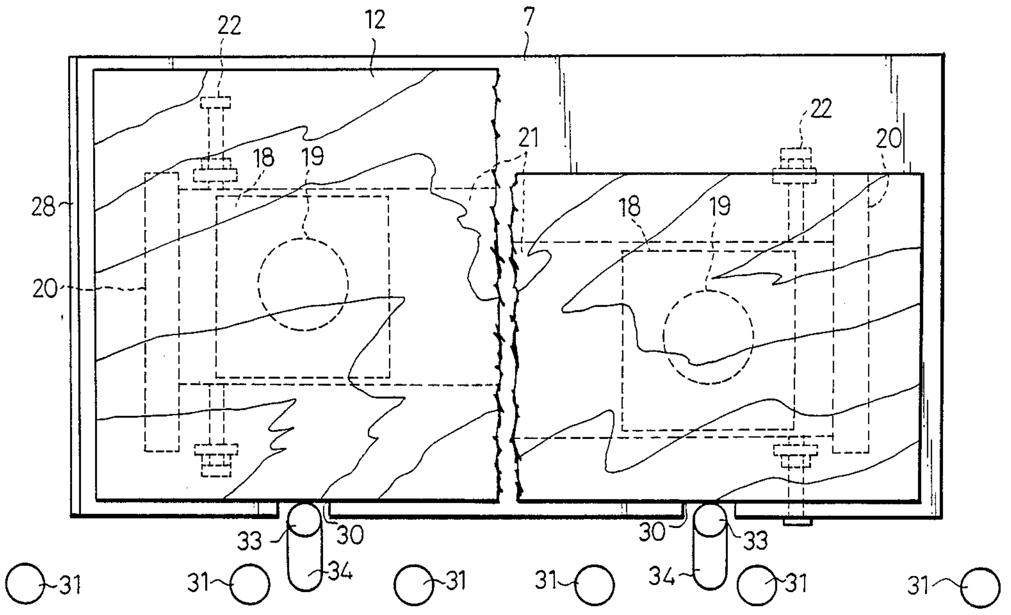
FIGS. 5 and 6 are each a fragmentary front elevational view which explains the movement of fluid cylinders and rams.

Means are provided for effecting the vertical positional adjustment of the cylinders 18 and the rams 19 in accordance with any change in dimensions of the sheet materials 12 to be pressed. Referring to FIG. 5, each of the frames 3 and 4 is provided on its surface facing one of the moving platens 8 with a pair of vertical sliding guides 20 which are to and fro spaced apart from each other. A sliding plate 21 is provided between the guides 20 and has a pair of vertical edges each supported slidably on one of the guides 20. The fluid cylinders 18 extend through the sliding plate 21. A gradual feed screw 22 is provided for moving the sliding plate 21 vertically along the guides 20. The screw 22 can be replaced by any other appropriate device, such as a device driven by fluid pressure or a rack and pinion assembly. Each moving platen 8 is also provided with a pair of vertical sliding guides 20 and a sliding plate 21 having a pair of vertical edges each supported slidably on one of the guides 20. The rams 19 extend through the sliding plate 21 provided on the moving platen 8. The rams 19 are vertically movable with the fluid cylinders 18.

Figure 6:
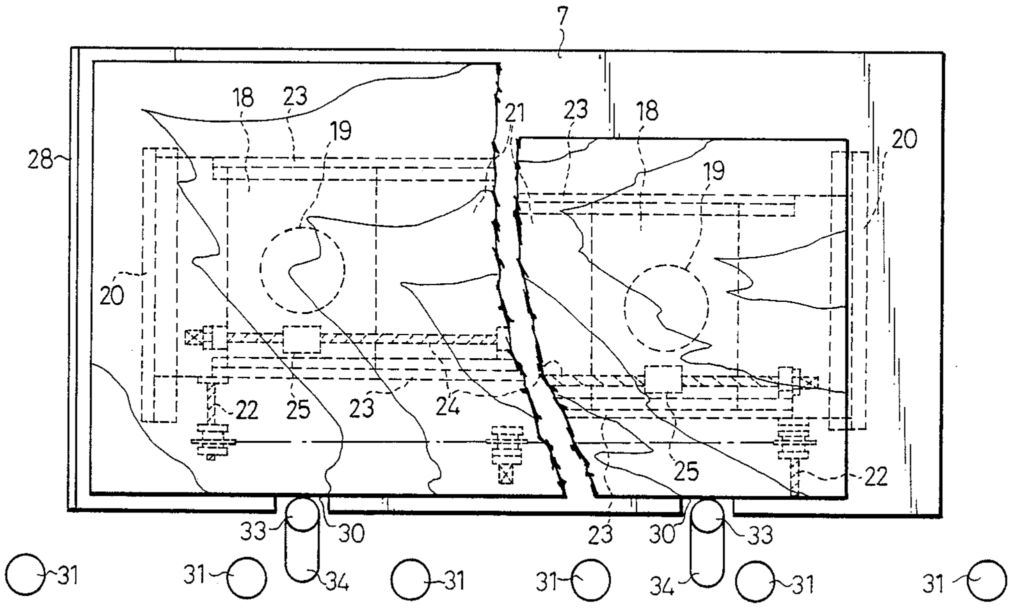

Referring to FIG. 6, additional means are provided for enabling the to-and-fro positional adjustment of the fluid cylinders 18 and the rams 19. The sliding plate 21 provided on each frame has a rectangular opening and is provided with a pair of to-and-fro sliding guides 23 at the upper and lower edges, respectively, of its opening. Each of the fluid cylinders 18 is supported between the guides 23 by an appropriate cylinder support not shown. A screw rod 24 is to and fro supported on the sliding plate 21 and has a length which is at least equal to that of the guides 23. The screw rod 24 has two screw thread portions which are oppositely threaded symmetrically with respect to the middle point of the screw rod 24. A pair of moving blocks 25 are threadedly fitted on the two screw thread portions, respectively. Each moving block 25 is connected to the cylinder support for one of the fluid cylinders 18, so that the cylinders 18 may be to and fro movable to or away from each other if the screw rod 24 is turned. A pair of to-and-fro sliding guides are also provided on the sliding plate 21 on each moving platen 8, though not shown. Each of the rams 19 is supported between the sliding guides by an appropriate support, so that the rams 19 may be to and fro movable to or away from each other with the fluid cylinders 18.

Each heating platen 7 has an inlet 26 at its top through which a heating medium, such as hot oil or steam, is supplied into an internal passage not shown, and an outlet 27 at its bottom through which the heating medium is discharged from the passage. Each heating platen 7 is provided on its vertical end located at the charging end of the press with a sheet guide 28 having a substantially triangular cross section and a pointed edge which facilitates the insertion of the sheet materials 12. The heating platen 7 and the guide 28 preferably comprise an integral structure formed by cutting a rigid plate, welding, or otherwise. Moreover, the guide 28 preferably has an internal passage connected with that of the heating platen 7, so that the heating medium may be supplied into the guide 28, too, to maintain its temperature equal to that of the platen 7.

An arch-shaped restraining member 29 bridges each pair of brackets 9 adjoining each other over one heating platen 7. The restraining member 29 has one end connected to one of the brackets 9 and the other end thereof is a free end which is engageable with the other bracket 9 when the press is opened. While the restraining members 29 are shown as provided on the brackets 9 for supporting the engaging and moving members 10 and 11, it is alternatively possible to provide additional brackets in the vicinity of the four corners so that they may not interfere with the sheet materials 12 being charged or discharged, and attach the restraining members 29 thereto in order to maintain the heating and moving platens 7 and 8 in mutually spaced apart relation.

Each heating platen 7 is provided at its bottom with a pair of appropriately spaced apart recesses 30. A conveyor 31 is provided below the heating platens 7 for conveying the sheet materials 12 when they are charged or discharged. The conveyor 31 comprises a plurality of rollers and is supported between a pair of frames 32 on the lower beams 2. A pair of lifting members 33 are also provided below the heating platens 7. Each lifting member 33 has a length which is substantially equal to the distance occupied by the heating platens 7 moved away from one another when the press is opened. Each lifting member 33 has an upper end which is normally located below the upper surface of the conveyor 31, but which is engageable in one of the recesses 30 of each heating platen 7 when the lifting member 33 is raised. A plurality of actuating members 34 are attached to each lifting member 33 and are rotatable about it. Each actuating member 34 has a thickness which is substantially equal to the distance between any two adjoining heating platens 7 moved away from each other when the press is opened. One of the actuating members 34 is provided between every two adjoining heating platens 7.

Description will now be made of the operation of the press as hereinabove described. If the fluid cylinders 18 are actuated to retract the rams 19, the moving platens 8 and the heating platens 7 are horizontally moved in two opposite directions away from one another along the rails 5 and 6, while their parallel relationship is maintained by the rails 6 and the engaging members 10 and they are allowed with any vertical and to-and-fro deformation. In the apparatus shown in FIGS. 2 and 3, the platens 7 and 8 are substantially suspended from the upper beams 1, insofar as the lower rails 5 and 6 are urged above the lower beams 2. In the apparatus shown in FIG. 4, however, the platens 7 and 8 substantially rest on the lower beams 2, as the upper rails 5 and 6 are urged below the upper beams 1. In either event, the platens 7 and 8 are smoothly movable on the rails 5 and 6, as the engaging and moving members 10 and 11 support the platens 7 and 8 at the four corners thereof so as to allow any vertical or to-and-fro deformation thereof.

As the platens 7 and 8 are moved away from one another, each restraining member 29 bridging a pair of brackets 9 adjoining each other over one heating platen 7, and having one end secured to one of the brackets 9 has its free end engaged with the other bracket 9. Thus, the restraining members 29 gradually restrain the maximum distance between any two adjoining platens so that the platens 7 and 8 may remain equally spaced apart from one another when the press is opened.

While, a heating medium remains supplied into the heating platens 7 through the inlets 27 to maintain all of the heating platens 7 at a predetermined temperature. A plurality of sheet materials 12 to be pressed are simultaneously loaded into the spaces defined by the heating platens 7 by a loader located in front of the charging end of the press. The conveyor 31 is driven to support the sheet materials 12 at the lower ends thereof and convey them to the center of the press between its charging and discharging ends.

Then, the lifting members 33 are raised by an appropriate device, such as a screw, crank or fluid-operated device, so that they may project above the upper surface of the conveyor 31. The lifting members 33 contact the lower ends of the sheet materials 12 and lift them from the conveyor 31 until they are engaged in the recesses 30 of the heating platens 7 as shown by two-dot chain lines in FIGS. 3 or 4, whereby the sheet materials 12 are completely positioned within the spaces defined by the heating platens 7. Then, the fluid cylinders 18 are actuated to advance the rams 19 toward each other, so that the moving platens 8 may move the heating platens 7 toward one another, whereby the press is closed.

The sheet materials 12 are heated by the heating platens 7 and pressed by virtue of the pressure applied by the fluid cylinders 18. As all of the heating platens 7 are supported at the four corners thereof so as to be deformable both vertically and to and fro, the pressure is applied uniformly to any portion of every sheet material 12. There does not occur any strain or other problem leading to the lack of uniformity in pressure application.

When the sheet materials 12 have been appropriately pressed, the rams 19 are retracted to open the press, the lifting members 33 are lowered to lower the sheet materials 12 onto the conveyor 31 and the conveyor 31 is driven to convey them to an unloader. In the event that an adhesive, wood resin, or the like has been released from the sheet materials 12 to the heating platens 7 and caused the sheet materials 12 to adhere to the platens 7, the actuating members 34 are rotated about the lifting members 33. The actuating members 34 are rotatable along circular paths between every two adjoining heating platens 7 to lift the sheet materials 12 off the platens 7.

It may sometimes necessary to press a group of sheet materials 12 which are differently sized from another group. FIG. 5 shows the adjustment which is required when the press is going to handle the sheet materials 12 having a smaller length, or distance between the two vertical edges thereof as shown in the right half of FIG. 5. The screws 22 are turned to lower the sliding plate 21 along the guides 20 to lower the fluid cylinders 18, while the rams 19 are likewise lowered, so that the pressure may be applied to the center of the sheet materials 12.

FIG. 6 shows the adjustment which is required when the press is going to handle the sheet materials 12 having both a smaller length and a smaller width or distance between the two horizontal edges thereof, as showing the right half of FIG. 6. It is necessary to move the cylinders 18 and the rams 19 both vertically and to and fro. The screw rod 24 is turned to move the moving blocks 25 toward each other, so that the cylinders 18 may be to and fro moved toward each other along the guides 23 by the distance by which the moving blocks 25 are moved toward each other, until they arrive at their new positions suitable for the new sheet materials 12. The positions of the rams 19 are also adjusted simultaneously.

According to this invention, the heating platens 7 are vertically disposed and are horizontally movable, as hereinabove described. They are easier to maintain or change than the heating platens in the related press as hereinbefore described. Moreover, they do not bend by their own weight When their thickness is determined, therefore, it is sufficient to consider only their ability to withstand pressure. Therefore, they have a smaller thickness and a lighter weight. They have a smaller distance therebetween which enables a reduction in the size of the press as a whole.

The press of this invention ensures the uniform application of pressure to any portion of the sheet materials 12 to be pressed, as opposed to the related press. There is no lack of uniformity resulting in improper adhesion or any undesirable reduction of thickness. According to the related press, the members for enabling the movement of each heating platen are fixed to its four corners, as hereinbefore stated. Therefore, if any heating platen has any dimensional error resulting from its manufacture or any strain due to thermal expansion, there is very likely to occur the chattering, dragging or inclination of any such platen when it is moved. Moreover, it is even possible that the platen may fail to be moved. According to this invention, however, every heating platen 7 is so supported at four points as to be capable of deforming itself both vertically and to and fro. There does not occur any vibration or undesirable displacement of any heating platen when it is moved. The combination of the rails 5 and the moving members 11 allows the horizontal movement of each heating platen 7 in the vertical plane in which it lies. The combination of the upper beams 1 and the upper rails 5 and 6 which are urged downwardly, or of the lower beams 2 and the lower rails 5 and 6 which are urged upwardly, allows the vertical movement of each heating platen. These arrangements absorb any dimensional error or strain of all the heating platens to enable the smooth movement of the heating platens to or away from one another.

The sheet materials 12 to be pressed can be positioned completely within the spaces defined by the heating platens 7, as the lifting members 33 are vertically movable past the upper surface of the conveyor 31 into engagement with the recesses 30 at the lower ends of the platens 7. Therefore, it is possible to apply pressure satisfactorily to even the lower ends of the sheet materials 12 and thereby prevent any unsatisfactory adhesion, while it is also possible to prevent any bending or layer separation from occurring to the lower end of any sheet material 12 when it is lifted.

As the fluid cylinders 18 and the rams 19 are movable together both vertically and to and fro in the vertical planes in which the sliding guides provided on the frames 3 and 4 and the moving platens 8 are disposed, the positions of the cylinders 18 and the rams 19 are adjustable in accordance with the dimensions of the sheet materials 12 to ensure that the pressure is always directed to the central portions of the sheet materials 12 irrespective of their dimensions. Therefore, it is possible to expect the same results of uniform adhesion from any sheet materials. The press need not be changed, even if the dimensions of the sheet materials to be pressed may be altered. It can heat and press differently sized groups of sheet materials under the optimum conditions which depend on their dimensions.

While the invention has been described with reference to the preferred embodiments thereof, it is to be understood that modifications or variations may be easily made by anybody of ordinary skill in the art without departing from the spirit and scope of this invention as defined by the appended claims.

What is claimed is:

1. A horizontal multiplaten press comprising:

(a) a pair of vertically disposed and horizontally spaced apart frames;

(b) at least one upper beam extending horizontally to connect said frames at the upper ends thereof;

(c) at least one lower beam extending horizontally to connect said frames at the lower ends thereof;

(d) rail means provided on each of said upper and lower beams and extending along the length thereof, said rail means on at least one of said beams being movable;

(e) a plurality of heating platens which are vertically supported in parallel to one another between said frames on said rail means, and which are horizontally movable along said rail means, said platens defining therebetween a plurality of spaces in which a plurality of sheet materials to be heated and pressed can be vertically disposed;

(f) at least one urging means provided on at least one of said frames för moving said platens horizontally to and away from one another; and (g) deformation allowing means provided on said rail means on at least one of said beams for allowing the deformation of each of said platens in a vertical direction due to thermal deformation of said platens and movement of said movable rail means.

2. A press as set forth in claim 1, wherein said deformation allowing means comprise at least one spring connecting at least one of said beams and said rail means and urging said rail means against said each platen.

3. A press as set forth in claim 2, wherein said spring is provided between said at least one lower beam and said rail means.

4. A press as set forth in claim 1, wherein said deformation allowing means comprises at least one fluid cylinder including a piston rod for connecting at least one of said upper and lower beams and said rail means and urging said means against said each platen.

5. A press as set forth in claim 4, wherein said fluid cylinder is provided between said at least one upper beam and said rail means.

6. A press as set forth in claim 1, including a pair of said upper beams, a pair of said lower beams and a pair of said urging means provided on each of said frames.

7. A press as set forth in claim 1, further including first and second means provided between at least one frame and one of said platens which adjoins said at least one frame, for adjusting the vertical and to-and-fro positions of said urging means to enable said urging means to apply pressure to said sheet materials under optimum conditions, even if said sheet materials may be changed from one group to another that is differently sized from said one group.

8. A press as set forth in claim 7, wherein said first position adjusting means comprises at least a pair of vertically extending and to and fro spaced apart sliding guides provided on said at least one frame, a vertically disposed sliding plate provided on said at least one frame slidably along each said pair of guides, said urging means extending to and fro through said sliding plate, at least one means provided on said sliding plate for moving it vertically, at least a pair of vertically extending and to and fro spaced apart sliding guides provided on said adjoining platen, and a vertically disposed sliding plate provided on said adjoining platen vertically slidably along each said pair of guides on said adjoining platen, said urging means having an end attached to said sliding plate on said adjoining platen.

9. A press as set forth in claim 8, wherein said second position adjusting means comprises a pair of to and fro extending and vertically spaced apart sliding guides provided at the upper and lower ends, respectively, of each of said sliding plates, said urging means being to and fro movably supported between said to and fro extending sliding guides, and means provided between said to and fro extending sliding guides for moving said urging means to and fro.

10. A press as set forth in claim 1, further including a conveyor provided below said platens for supporting and conveying said sheet materials.

11. A press as set forth in claim 10, further including a pair of to and fro spaced apart lifting means disposed horizontally below said platens, said conveyor having an upper surface located below said platens, each said lifting means being normally positioned below said upper surface of said conveyor, but upwardly movable for lifting said sheet materials from said conveyor, each of said platens having a lower end formed with a pair of to and fro spaced apart recesses, each of said lifting means being engageable in one of said recesses when it is upwardly moved.

12. A press as set forth in claim 11, wherein each of said lifting means if provided with a plurality of rotatable members each having a thickness which is substantially equal to the width of any of said spaces which said platens have when they are moved away from one another, said members being rotatable about said lifting means for entering said spaces and thereby lifting said sheet materials off said platens if said sheet material heated and pressed between any adjoining two of said platens adheres thereto.

* * * * *